US009848320B2

(12) United States Patent
Mu

(10) Patent No.: US 9,848,320 B2
(45) Date of Patent: Dec. 19, 2017

(54) ENCRYPTED COMMUNICATIONS METHOD AND ENCRYPTED COMMUNICATIONS SYSTEM

(71) Applicant: Datong Mu, Beijing (CN)

(72) Inventor: Datong Mu, Beijing (CN)

( * ) Notice: Subject to any disclaimer, the term of this patent is extended or adjusted under 35 U.S.C. 154(b) by 0 days.

(21) Appl. No.: 14/907,280

(22) PCT Filed: Jul. 8, 2014

(86) PCT No.: PCT/CN2014/081835
§ 371 (c)(1),
(2) Date: Jan. 23, 2016

(87) PCT Pub. No.: WO2015/010537
PCT Pub. Date: Jan. 29, 2015

(65) Prior Publication Data
US 2016/0165435 A1    Jun. 9, 2016

(30) Foreign Application Priority Data
Jul. 24, 2013   (CN) .......................... 2013 1 0314997

(51) Int. Cl.
*H04L 9/00*     (2006.01)
*H04W 12/02*   (2009.01)
*H04W 12/04*   (2009.01)
*H04W 12/06*   (2009.01)

(52) U.S. Cl.
CPC ........... *H04W 12/02* (2013.01); *H04W 12/04* (2013.01); *H04W 12/06* (2013.01)

(58) Field of Classification Search
CPC ....................................................... H04L 9/00
See application file for complete search history.

(56) References Cited

U.S. PATENT DOCUMENTS

| 2002/0052965 A1* | 5/2002 | Dowling ............... H04W 12/02 |
| | | 709/230 |
| 2007/0092112 A1* | 4/2007 | Awatsu ................... G06F 21/32 |
| | | 382/115 |
| 2008/0123856 A1 | 5/2008 | Won et al. |

FOREIGN PATENT DOCUMENTS

| CN | 102737311 A | 10/2012 |
| CN | 103001976 A | 3/2013 |
| CN | 103415008 A | 11/2013 |

* cited by examiner

*Primary Examiner* — Josnel Jeudy
(74) *Attorney, Agent, or Firm* — Andrew W. Chu; Craft Chu PLLC

(57) ABSTRACT

The encrypted communication method and an encrypted communication system include a mobile terminal and an application server to execute two-way authentication and establish encrypted mobile communication between them, and then execute key derivation. A client host is started up, and reads and run client system software and client network application software stored in its Read-Only Memory (ROM). The client host and the application server retrieve the IP address of the counter-party respectively, and set IP address filtering rules respectively. The application server generates random numbers and keys, and sends the random numbers and the keys to the client host via the mobile terminal. The client host and the application server execute IP address filtering, two-way authentication, and key negotiation, and thereby establish encrypted network communication. The system and method ensure end-to-end security of network applications.

13 Claims, 7 Drawing Sheets

US 9,848,320 B2

ENCRYPTED COMMUNICATIONS METHOD AND ENCRYPTED COMMUNICATIONS SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the fields of Internet technology, LAN technology, mobile communication technology, and information security technology, in particular to an encrypted communication method and an encrypted communication system.

2. Description of Related Art Including Information Disclosed Under 37 CFR 1.97 and 37 CFR 1.98

The development of Internet has brought various network security problems, mainly including: stealing sensitive information of users (e.g., user passwords) from the clients of the users by means of Trojan viruses; conducting Internet frauds by phishing; utilizing remote control over the clients of the users to tamper with the data and operations of the user, and thereby initiate DDoS attacks, etc., after invading and controlling a large quantity of clients.

In addition, session key generation processes for encrypted communication (e.g., PKI key exchange process based on an asymmetric encryption algorithm applicable to Internet, WPA-PSK/WPA2-PSK key negotiation process based on a symmetric encryption algorithm applicable to WLAN, etc.) can't avoid the risk of exhaustive attacks. With the development of parallel computing technology and distributed computing technology, these problems become prominent increasingly.

In view of the network security problems described above, the present invention puts forth an encrypted communication method and an encrypted communication system.

BRIEF SUMMARY OF THE INVENTION

The technical problem to be solved in the present invention is to provide an encrypted communication method and an encrypted communication system, which enable a client host and an application server to utilize a mobile terminal to transmit IP addresses, random numbers, and keys, execute IP address filtering, two-way authentication and key negotiation, and thereby establish encrypted network communication between them, so as to improve the security of network applications.

To solve the technical problem described above, the present invention employs the following technical scheme:

An encrypted communication method is provided. Before the encrypted communication method is used, the user registers to an application server, and submit user information to the application server. The user information comprises: the user's biometric signature, MSISDN (Mobile Subscriber Integrated Services Digital Network Number) of the mobile user's mobile terminal, IMSI (International Mobile Subscriber Identity) of the mobile terminal, IMEI (International Mobile Equipment Identity) of the mobile terminal, ICCID (Integrated Circuit Card Identity) of a SIM card in the mobile terminal, bank account number (debit card, credit card, or bankbook), and ID, validity period or address indicated on the identity card; the application server generates symmetric keys Ka/Ka', Kc/Kc', MemPa/MemPa', MemKa/MemKa', MemPc/MemPc', and MemKc/MemKc', writes the Ka, Kc, MemPa, MemKa, MemPc, and MemKc into the mobile terminal, so that the mobile terminal and the application server can execute two-way authentication and establish encrypted mobile communication between them, and then execute key derivation between them. The encrypted communication method comprises the following steps:

step A. the mobile terminal and the application server execute two-way authentication and establish encrypted mobile communication, and then execute key derivation between them;

step B: a client host is started, and the client host reads and runs client system software and client network application software stored in a Read-Only Memory;

step C. the client host and the application server retrieve the IP address of the counter-party respectively, and set IP address filtering rules respectively;

step D. the application server generates random numbers and keys, and sends the random numbers and the keys to the client host via the mobile terminal;

step E: the client host and the application server execute IP address filtering, two-way authentication and key negotiation, and thereby establish encrypted network communication between them.

A beneficial effect of the method described above is: end-to-end security of network applications is ensured.

Based on the technical scheme described above, the encrypted communication method can be further improved as follows:

Furthermore, the step A comprises:

step A11: the mobile terminal and the application server execute two-way authentication on the basis of symmetric authentication keys Ka/Ka', and establish encrypted mobile communication on the basis of symmetric communication keys Kc/Kc' between them, wherein, the Ka/Ka' and the Kc/Kc' have no calculation relationship between them;

step A12: the application server generates random numbers R1, R2, R3 and R4, and derives a new authentication key Ka', wherein, the Ka' derivation process comprises:

the application server calculates MemPa'=f(R1, MemPa'), on the basis of MemPa' stored in the application server, where, R1 is a random number, MemPa' is a key, f is an encryption function, and f comprises an one-way hashing function, a symmetric encryption function, and a function composed of the two functions;

the application server calculates MemKa'=f(R2, MemKa'), on the basis of MemKa' stored in the application server, where, R2 is a random number, and MemKa' is a key;

the application server calculates Ka'=f(R1, R2, MemPa', MemKa'), where, R1 and R2 are random numbers, MemPa' is a parameter, and MemKa' is a key;

the application server derives a new communication key Kc', wherein, the Kc' derivation process and the Ka' derivation process have no calculation relationship between them, and the Kc' derivation process comprises:

the application server calculates MemPc'=f(R3, MemPc'), on the basis of MemPc' stored in the application server, where, R3 is a random number, and MemPc' is a key;

the application server calculates MemKc'=f(R4, MemKc'), on the basis of MemKc' stored in the application server, where, R4 is a random number, and MemKc' is a key;

the application server calculates Kc'=f(R3, R4, MemPc', MemKc'), where, R3 and R4 are random numbers, MemPc' is a parameter, and MemKc' is a key;

the application server stores the Ka', Kc', MemPa', MemKa', MemPc', and MemKc', so that they can be used for the next cycle of two-way authentication, encrypted communication, and key derivation;

step A13: the application server sends the random numbers R1, R2, R3 and R4 to the mobile terminal;

step A14: the mobile terminal derives a new authentication key Ka, wherein, the Ka derivation process comprises:

the mobile terminal calculates MemPa=f(R1, MemPa), on the basis of MemPa stored in the mobile terminal, where, R1 is a random number, and MemPa is a key;

the mobile terminal calculates MemKa=f(R2, MemKa), on the basis of MemKa stored in the mobile terminal, where, R2 is a random number, and MemKa is a key;

the mobile terminal calculates Ka=f(R1, R2, MemPa, MemKa), where, R1 and R2 are random numbers, MemPa is a parameter, and MemKa is a key;

the mobile terminal derives a new communication key Kc, wherein, the Kc derivation process and the Ka derivation process have no calculation relationship between them, and the Kc derivation process comprises:

the mobile terminal calculates MemPc=f(R3, MemPc), on the basis of MemPc stored in the mobile terminal, where, R3 is a random number, and MemPc is a key;

the mobile terminal calculates MemKc=f(R4, MemKc), on the basis of MemKc stored in the mobile terminal, where, R4 is a random number, and MemKc is a key;

the mobile terminal calculates Kc=f(R3, R4, MemPc, MemKc), where, R3 and R4 are random numbers, MemPc is a parameter, and MemKc is a key;

the mobile terminal stores the Ka, Kc, MemPa, MemKa, MemPc, and MemKc, so that they can be used for the next cycle of two-way authentication, encrypted communication, and key derivation.

A beneficial effect of the further improved technical scheme described above is: since the authentication keys Ka/Ka' and the communication key Kc/Kc' have no calculation relationship between them, exhaustive attacks to the Kc/Kc' based on the authentication information of the Ka/Ka' is prevented. After the execution step A is executed for n times, the key derivations of MemPa, MemKa, MemPc, and MemKc follow recursive operation Kn=f(Rn, f(Rn−1, f( . . . , f(Ri, f(Ri−1, f( . . . , f(R2, f(R1, K0))))))))), where, 1≤i≤n, Kn, . . . , Ki, . . . , K0 are keys and Ki=f(Ri, Ki−1), Rn, Rn−1, . . . , Ri, . . . , R2, R1 are random numbers and are transmitted by encrypted communication, f is an encryption function and comprises an one-way hashing function, a symmetric encryption function, and a function composed of the two functions, the MemPa/MemPa' and MemKa/MemKa' that are based on the recursive operation are used as parameters and keys to calculate authentication keys Ka/Ka', and the MemPc/MemPc' and MemKc/MemKc' that are based on the recursive operation are used as parameters and keys to calculate communication keys Kc/Kc, instead of calculating the authentication keys and communication keys on the basis of root keys; in addition, the Kc/Kc' derivation process and the Ka/Ka' derivation process have no calculation relationship between them. Thus, the security of two-way authentication and encrypted communication is enhanced.

Furthermore, the step B comprises:

step B11: the client host is started up;

step B12: the client host reads and runs the client system software stored in the ROM;

step B13: the client host disables the local hard disk with the client system software;

step B14: the client host reads and runs the client network application software stored in the ROM.

A beneficial effect of the further improved technical scheme described above is: since the client host uses the software stored in the ROM and disables the hard disk of the client host, the harms of any potential computer virus in the hard disk of the client host to network applications are prevented.

Furthermore, the step C comprises:

step C11: the client host obtains an IP address IPAc for the client host from Internet;

step C12: the client host reads the IP address IPAs of the application server stored in the ROM; or, the client host instructs the user to retrieve the IP address IPAs of the application server with the mobile terminal from the application server, and instructs the user to input the IPAs into the client host;

step C13: the client host sets IP address filtering rules, to permit the client host to receive IP data packets of which the source IP address is the IPAs;

step C14: the client host prompts the user to use the mobile terminal to send the IPAc to the application server;

step C15: the IPAc is inputted into the mobile terminal;

step C16: the mobile terminal sends the IPAc to the application server, and the application server receives the IPAc, and obtains the MSISDN (Mobile Station Integrated Services Digital Network Number) of the mobile user's mobile terminal at the same time;

step C17: the application server sets IP address filtering rules, to permit the application server to receive IP data packets of which the source IP address is the IPAc.

A beneficial effect of the further improved technical scheme described above is: since the client host directly utilize the IPAs to access the application server instead of using DNS, the harms of DNS hijacking to network applications are prevented. The client host instructs the user to send the IPAc to the application server via the mobile terminal, so that the application server can learn about the IP address of the visiting client host and thereby set IP address filtering rules.

Furthermore, the step D comprises:

step D11: the application server generates random numbers rand1 and rand2, and symmetric keys K1/K1', K2/K2' and K3/K3', wherein, any two of the K1, K2 and K3 have no calculation relationship between them;

step D12: the application server sends the rand1, rand2, K1, K2, and K3 to the mobile terminal;

step D13: the mobile terminal prompts the user to input the rand1, rand2, K1, K2, and K3 into the client host;

step D14: the rand1, rand2, K1, K2, and K3 are inputted into the client host.

A beneficial effect of the further improved technical scheme described above is: since the application server sends the random numbers and keys to the client host via the mobile terminal, confidentiality and privacy of the network communication is ensured.

Furthermore, the step E comprises:

step E11: the client host calculates res1=f(rand1, K1), where, re1 is response, rand1 is a random number, K1 is a key, f is an encryption function, and f comprises an one-way hashing function, a symmetric encryption function, and a function composed of the two functions;

step E12: the client host sends the res1 by means of an IP data packet IP1, to the application server, wherein, the source IP address of the IP1 is the IPAc;

step E13: the application server executes IP address filtering, receives the IP1 according to the IP address filtering rules, and permits the client host to connect to the application server;

step E14: the application server calculates res1'=f(rand1, K1'), wherein, re1' is response, rand1 is a random number, and K1' is a key;

step E15: the application server compares the res1' with the res1; the execution jumps to step E16 if they are the same; otherwise the entire process is terminated;

step E16: the application server calculates res2'=f(rand2, K2'), wherein, re2' is response, rand2 is a random number, and K2' is a key; the application server generates a random number rand3, and calculates rand3_c=E(rand3, K3'), where, rand3_c is the cryptograph, K3' is a key, and E is an encryption function;

step E17: the application server sends the res2' and rand3_c by means of an IP data packet IP2 to the client host, wherein, the source IP address of the IP2 is the IPAs;

step E18: the client host executes IP address filtering, receives the IP2 according to the IP address filtering rules, and permits the application server to connect to the client host;

step E19: the client host calculates res2=f(rand2, K2), where, res2 is response, rand2 is a random number, and K2 is a key; the client host calculates rand3_p=D(rand3_c, K3), where, rand3_p is plain text obtained by decrypting the rand3_c, rand3_c is the cryptograph, K3 is a key, and D is a decryption function corresponding to the encryption function E;

step E20: the client host compares the res2 with the res2'; the execution jumps to step E21 if they are the same; otherwise the entire process is terminated;

step E21: the client host prompts the user to input the MSISDN into the client host;

step E22: the MSISDN is inputted into the client host;

step E23: the client host and the application server negotiate a session key Ks on the basis of the rand3_p/rand3, MSISDN, and K3/K3', and establish encrypted network communication on the basis of the Ks between them; or, the application server selects a parameter C in random in the user information provided by the user when the user opens the account, and prompts the name of the parameter C to the user via the mobile terminal or the client host and instructs the user to input the parameter C into the client host; and the client host and the application server negotiate a session key Ks on the basis of the parameter C, rand3_p/rand3, MSISDN, and K3/K3', and establish encrypted network communication on the basis of the Ks between them.

A beneficial effect of the further improved technical scheme described above is: since the application server executes IP address filtering and authenticates the client host, the harms of DDoS attacks to the application server are prevented. Since the client host executes IP address filtering and authenticates the application server, the harms of phishing to the client host are prevented. In the two-way authentication process for network communication, since no random number is transmitted between the client host and the application server, only responses res1 and res2' are transmitted instead, and res1 and res2' have no calculation relationship between them, exhaustive attacks to the authentication keys K1 and K2 on the basis of authentication information transmitted over the network are prevented. since there is no calculation relationship between res1 and K3 and between res2' and K3, exhaustive attacks to the session key Ks on the basis of authentication information transmitted over the network are prevented; since the session key Ks is negotiated on the basis of the MSISDN that is not transmitted (in a mobile communication network, TMSI (Temporary Mobile Subscriber Identity) and IMSI are utilized instead of the MSISDN to identify a mobile terminal. In addition, in a mobile communication network, the MSISDN and subscriber service corresponding to the TMSI/IMSI are sent to the application server), the parameter C that is selected in random and is not transmitted, the K3 transmitted through the mobile communication network, and the rand3 transmitted by encrypted transmission over Internet, the security of the key negotiation process is enhanced.

Furthermore, in the step E23, the user information provided by the user when the user opens the account comprises the user's biometric signature, IMSI (International Mobile Subscriber Identity), IMEI (International Mobile Equipment Identity), ICCID (Integrated Circuit Card Identity), bank account number, ID indicated on the identity card, expiry date indicated on the identity card or address indicated on the identity card.

A beneficial effect of the further improved technical scheme described above is: Since a parameter C that is selected in random in the user information is used to negotiate the session key Ks and the parameter C is not transmitted, the security of the key negotiation process is enhanced.

Furthermore, in the encrypted communication method described above, if the symmetric keys K1 and K2 are replaced with asymmetric keys K1a and K2a and any two of K1a, K2a, and symmetric key K3 have no calculation relationship between them, and the encryption function f is replace with an asymmetric encryption/decryption function, the client host, which is based on the private key K1a and the public key K2a, and the application server, which is based on the private key K2a and the public key K1a, execute two-way authentication between them simply by transmitting responses, without transmitting random numbers or exchanging public keys, and the responses have no calculation relationship between them.

A beneficial effect of the further improved technical scheme described above is: the encrypted communication method can employs an asymmetric encryption algorithm to execute two-way authentication. Since only the responses are transmitted in the two-way authentication, without transmitting any random number or exchanging any public key, and the responses have no calculation relationship between them, exhaustive attacks to the authentication key K1a and K2a on the basis of authentication information transmitted over the network are prevented. Since there is no calculation relationship between Ma and K3 and between K2a and K3, exhaustive attacks to the session key Ks on the basis of authentication information transmitted over the network are prevented.

Furthermore, in the encrypted communication method described above, in the two-way authentication process, only responses are transmitted, without transmitting random numbers, and public keys are not exchanged if an asymmetric encryption algorithm is used. In addition, the responses have no calculation relationship between them, and the responses and the session key have no calculation relationship between them.

A beneficial effect of the further improved technical scheme described above is: since only responses are transmitted and the responses have no calculation relationship between them, exhaustive attacks to the authentication keys on the basis of authentication information are prevented. Since the responses and the session key also have no calculation relationship between them, exhaustive attacks to the session key on the basis of authentication information are prevented.

Furthermore, in each of the execution steps of the encrypted communication method, all functions of the client host can be accomplished via the mobile terminal.

A beneficial effect of the further improved technical scheme described above is: the cost of the scheme is lower.

In correspondence to the encrypted communication method described above, the technical scheme of the present invention further comprises an encrypted communication system, which comprises a ROM, a client host, a mobile terminal, and an application server.

The ROM is used to provide client system software, client network application software, and IP address of the application server to the client host.

The client host is connected with the application server through a data communication network, and is used to read and run the client system software and the client network application software stored in the ROM, and read the IP address of the application server stored in the ROM, after it is started up; is used to send the IP address of the client host to the application server via the mobile terminal; is used to receive random numbers and keys from the application server via the mobile terminal; and is used to execute IP address filtering on the basis of the IP address of the application server, and execute two-way authentication and key negotiation with the application server, and thereby establish encrypted network communication with the application server;

the mobile terminal is connected with the application server through a mobile communication network, and is used to execute two-way authentication and establish encrypted mobile communication with the application server; and is used to transmit random numbers, keys, and IP addresses to the client host and the application server;

the application server is used to execute two-way authentication and establish encrypted mobile communication with the mobile terminal; is used to receive the IP address of the client host via the mobile terminal; is used to generate random numbers and keys, and send the random numbers and the keys to the client host via the mobile terminal; and is used to execute IP address filtering on the basis of the IP address of the client host, and execute two-way authentication and key negotiation with the client host, and thereby establish encrypted network communication with the client host.

A beneficial effect of the method described above is: end-to-end security of network applications is ensured.

Based on the technical scheme described above, the encrypted communication system can be further improved as follows:

Furthermore, the ROM is any one of CD-ROM, DVD-ROM, MASK ROM, PROM, EPROM, OTP ROM, EEPROM and Flash ROM.

Furthermore, the ROM is connected with the client host via a wired communication interface or wireless communication interface, or the ROM is designed as a hardware unit of the client host.

Furthermore, the mobile terminal is any one of mobile phone, PDA, tablet PC, and laptop computer.

Furthermore, in the encrypted communication system, all functions of the client host can be accomplished via the mobile terminal.

Furthermore, the data communication network comprises wide area network (WAN), metropolitan area network (MAN), and local area network (LAN); the mobile terminal communicates with the application server by voice communication, SMS communication, or data communication.

The system and method provided in the present invention ensure end-to-end security of network applications.

101—ROM; 102—client host; 103—mobile terminal; 104—application server.

DETAILED DESCRIPTION OF THE INVENTION

Hereunder the principle and features of the present invention will be detailed with reference to the accompanying drawings. However, it should be noted that the embodiments are provided only to interpret the present invention but don't constitute any limitation to the scope of the present invention.

Figure 1:
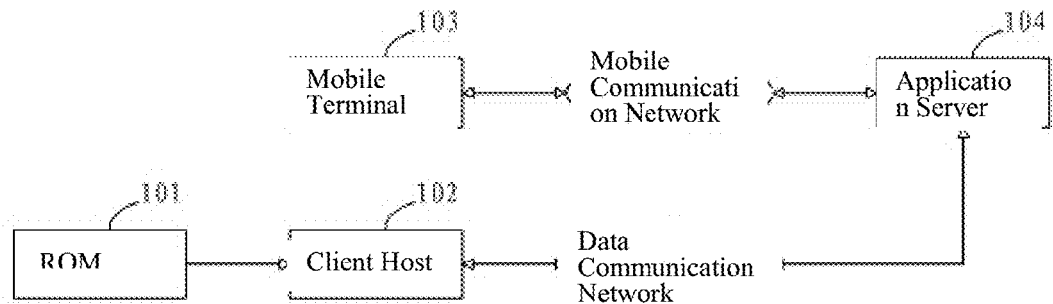
FIG. 1 is a schematic structural diagram of the encrypted communication system in embodiment 1 of the present invention.

As shown in FIG. 1, in embodiment 1, an encrypted communication system is provided, comprising a ROM 101, a client host 102, a mobile terminal 103, and an application server 104.

The ROM 101 is used to provide client system software, client network application software, and the IP address of the application server 104 to the client host 102, wherein, the client network application software comprises browser, security software, instant messaging software, and gaming software, etc.

The client host 102 is connected with the application server 104 through a data communication network, and is used to read and run the client system software and the client network application software stored in the ROM 101, and read the IP address of the application server 104 stored in the ROM 101, after it is started up; is used to send the IP address of the client host to the application server 104 via the mobile terminal 103; is used to receive random numbers and keys from the application server 104 via the mobile terminal 103; and is used to execute IP address filtering on the basis of the IP address of the application server 104, and execute two-way authentication and key negotiation with the application server 104, and thereby establish encrypted network communication with the application server 104;

the mobile terminal 103 is connected with the application server 104 through a mobile communication network, and is used to execute two-way authentication and establish encrypted mobile communication with the application server 104; and is used to transmit random numbers, keys, and IP addresses to the client host 102 and the application server 104;

the application server 104 is used to execute two-way authentication and establish encrypted mobile communication with the mobile terminal 103; is used to receive the IP address of the client host 102 via the mobile terminal 103; is used to generate random numbers and keys, and send the random numbers and the keys to the client host 102 via the mobile terminal 103; and is used to execute IP address filtering on the basis of the IP address of the client host 102, and execute two-way authentication and key negotiation with the client host 102, and thereby establish encrypted network communication with the client host 102.

In embodiment 1, the data communication network comprises wide area network (WAN), metropolitan area network (MAN), and local area network (LAN); the mobile terminal 103 communicates with the application server 104 by voice communication, SMS communication, or data communication; the ROM 101 is any one of CD-ROM, DVD-ROM, MASK ROM, PROM, EPROM, OTP ROM, EEPROM and Flash ROM; the mobile terminal 103 is any one of mobile phone, PDA, tablet PC and laptop computer, and can accomplish all functions of the client host 102.

Figure 2:
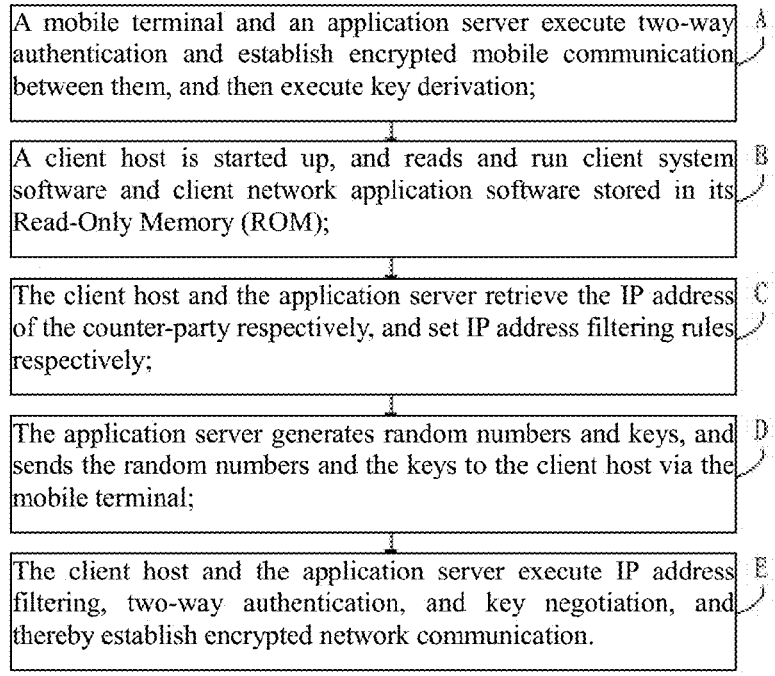
FIG. 2 is a flow diagram of the encrypted communication method in embodiment 2 of the present invention.

As shown in FIG. 2, in embodiment 2, an encrypted communication method is provided, comprising the following steps:

step A. the mobile terminal and the application server execute two-way authentication and establish encrypted mobile communication, and then execute key derivation between them;

step B: a client host is started, and the client host reads and runs client system software and client network application software stored in a Read-Only Memory;

step C. the client host and the application server retrieve the IP address of the counter-party respectively, and set IP address filtering rules respectively;

step D. the application server generates random numbers and keys, and sends the random numbers and the keys to the client host via the mobile terminal;

step E: the client host and the application server execute IP address filtering, two-way authentication and key negotiation, and thereby establish encrypted network communication between them.

In each of the execution steps described above, all functions of the client host can be accomplished via the mobile terminal.

Figure 9:
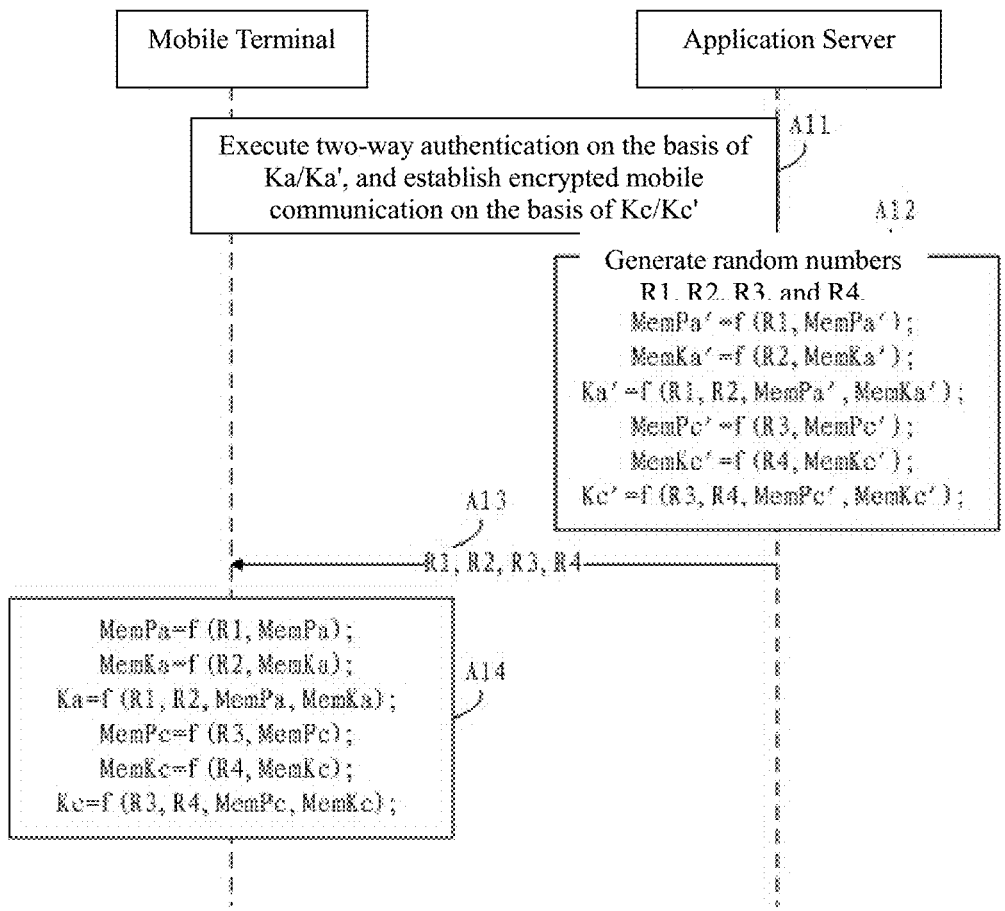
FIG. 9 is a flow diagram of the step A in the encrypted communication method in embodiment 2 of the present invention.

As shown in FIG. 9, in the embodiment 2, the step A further comprises:

step A11: the mobile terminal and the application server execute two-way authentication on the basis of symmetric authentication keys Ka/Ka', and establish encrypted mobile communication on the basis of symmetric communication keys Kc/Kc' between them, wherein, the Ka/Ka' and the Kc/Kc' have no calculation relationship between them;

step A12: the application server generates random numbers R1, R2, R3 and R4, and derives a new authentication key Ka', wherein, the Ka' derivation process comprises:

the application server calculates MemPa'=f(R1, MemPa'), on the basis of MemPa' stored in the application server, where, R1 is a random number, MemPa' is a key, f is an encryption function, and f comprises an one-way hashing function, a symmetric encryption function, and a function composed of the two functions;

the application server calculates MemKa'=f(R2, MemKa'), on the basis of MemKa' stored in the application server, where, R2 is a random number, and MemKa' is a key;

the application server calculates Ka'=f(R1, R2, MemPa', MemKa'), where, R1 and R2 are random numbers, MemPa' is a parameter, and MemKa' is a key;

the application server derives a new communication key Kc', wherein, the Kc' derivation process and the Ka' derivation process have no calculation relationship between them, and the Kc' derivation process comprises:

the application server calculates MemPc'=f(R3, MemPc'), on the basis of MemPc' stored in the application server, where, R3 is a random number, and MemPc' is a key;

the application server calculates MemKc'=f(R4, MemKc'), on the basis of MemKc' stored in the application server, where, R4 is a random number, and MemKc' is a key;

the application server calculates Kc'=f(R3, R4, MemPc', MemKc'), where, R3 and R4 are random numbers, MemPc' is a parameter, and MemKc' is a key;

the application server stores the Ka', Kc', MemPa', MemKa', MemPc', and MemKc', so that they can be used for the next cycle of two-way authentication, encrypted communication, and key derivation;

step A13: the application server sends the random numbers R1, R2, R3 and R4 to the mobile terminal;

step A14: the mobile terminal derives a new authentication key Ka, wherein, the Ka derivation process comprises:

the mobile terminal calculates MemPa=f(R1, MemPa), on the basis of MemPa stored in the mobile terminal, where, R1 is a random number, and MemPa is a key;

the mobile terminal calculates MemKa=f(R2, MemKa), on the basis of MemKa stored in the mobile terminal, where, R2 is a random number, and MemKa is a key;

the mobile terminal calculates Ka=f(R1, R2, MemPa, MemKa), where, R1 and R2 are random numbers, MemPa is a parameter, and MemKa is a key;

the mobile terminal derives a new communication key Kc, wherein, the Kc derivation process and the Ka derivation process have no calculation relationship between them, and the Kc derivation process comprises:

the mobile terminal calculates MemPc=f(R3, MemPc), on the basis of MemPc stored in the mobile terminal, where, R3 is a random number, and MemPc is a key;

the mobile terminal calculates MemKc=f(R4, MemKc), on the basis of MemKc stored in the mobile terminal, where, R4 is a random number, and MemKc is a key;

the mobile terminal calculates Kc=f(R3, R4, MemPc, MemKc), where, R3 and R4 are random numbers, MemPc is a parameter, and MemKc is a key;

the mobile terminal stores the Ka, Kc, MemPa, MemKa, MemPc, and MemKc, so that they can be used for the next cycle of two-way authentication, encrypted communication, and key derivation.

Figure 3:
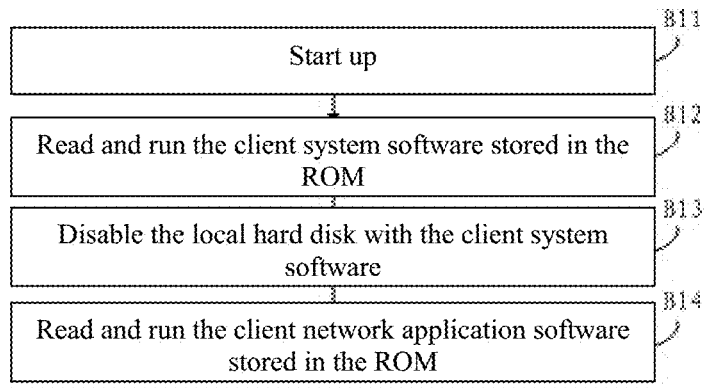
FIG. 3 is a flow diagram of the step B in the encrypted communication method in embodiment 2 of the present invention.

As shown in FIG. 3, in the embodiment 2, the step B further comprises:

step B11: the client host is started up;

step B12: the client host reads and runs the client system software stored in the ROM;

step B13: the client host disables the local hard disk with the client system software;

step B14: the client host reads and runs the client network application software stored in the ROM.

Figure 4:
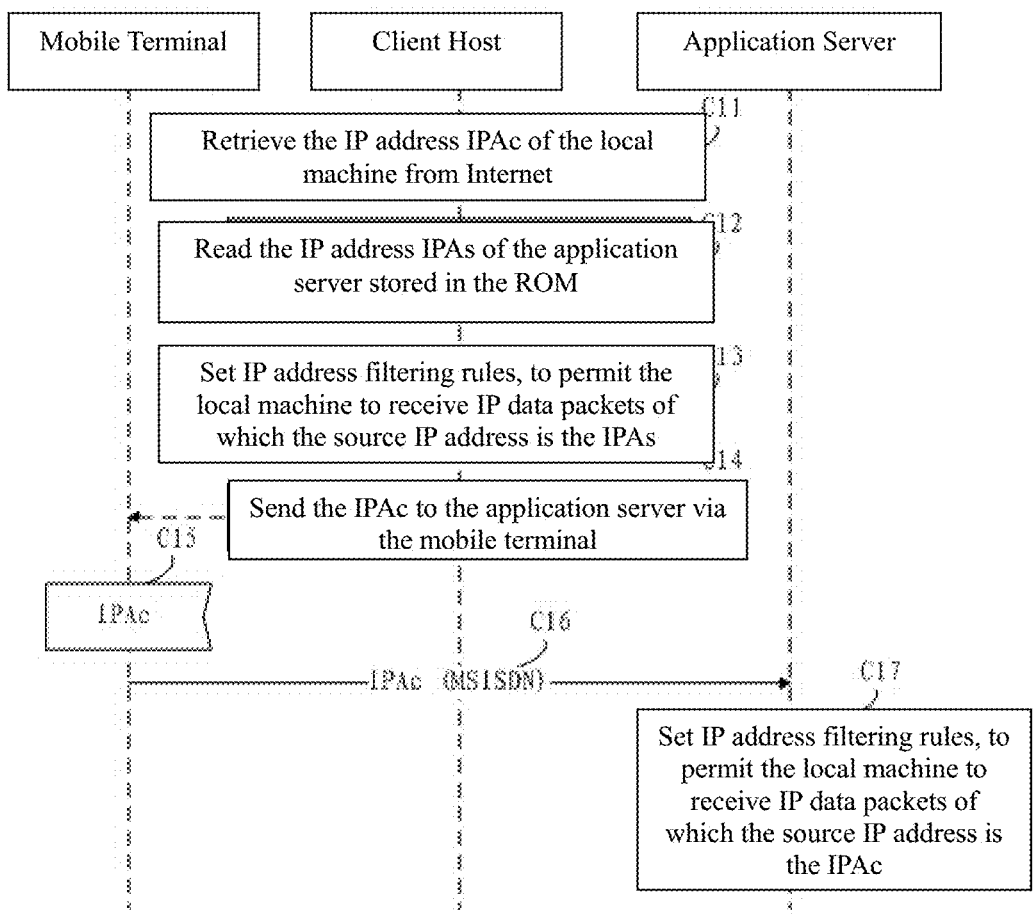
FIG. 4 is a flow diagram of the step C in the encrypted communication method in embodiment 2 of the present invention.

As shown in FIG. 4, in the embodiment 2, the step C further comprises:

step C11: the client host obtains an IP address IPAc for the client host from Internet;

step C12: the client host reads the IP address IPAs of the application server stored in the ROM; or, the client host instructs the user to retrieve the IP address IPAs of the application server with the mobile terminal from the application server, and instructs the user to input the IPAs into the client host;

step C13: the client host sets IP address filtering rules, to permit the client host to receive IP data packets of which the source IP address is the IPAs;

step C14: the client host prompts the user to use the mobile terminal to send the IPAc to the application server;

step C15: the IPAc is inputted into the mobile terminal;

step C16: the mobile terminal sends the IPAc to the application server, and the application server receives the IPAc, and obtains the MSISDN (Mobile Station Integrated Services Digital Network Number) of the mobile user's mobile terminal at the same time;

step C17: the application server sets IP address filtering rules, to permit the application server to receive IP data packets of which the source IP address is the IPAc.

Figure 5:
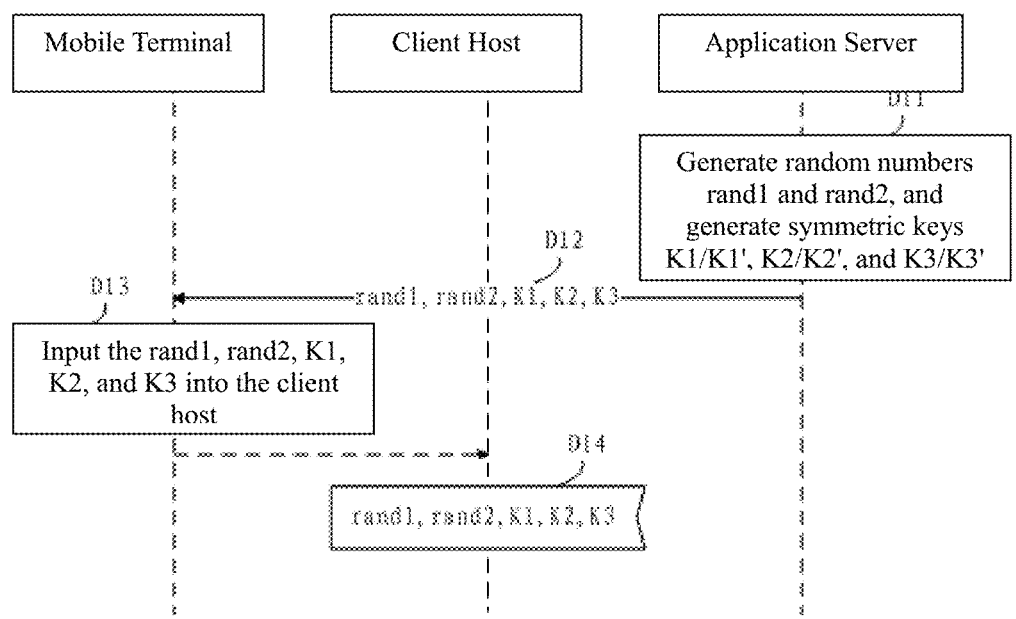
FIG. 5 is a flow diagram of the step D in the encrypted communication method in embodiment 2 of the present invention.

As shown in FIG. 5, in the embodiment 2, the step D further comprises:

step D11: the application server generates random numbers rand1 and rand2, and symmetric keys K1/K1', K2/K2' and K3/K3', wherein, any two of the K1, K2 and K3 have no calculation relationship between them;

step D12: the application server sends the rand1, rand2, K1, K2, and K3 to the mobile terminal;

step D13: the mobile terminal prompts the user to input the rand1, rand2, K1, K2, and K3 into the client host;

step D14: the rand1, rand2, K1, K2, and K3 are inputted into the client host.

Figure 6:
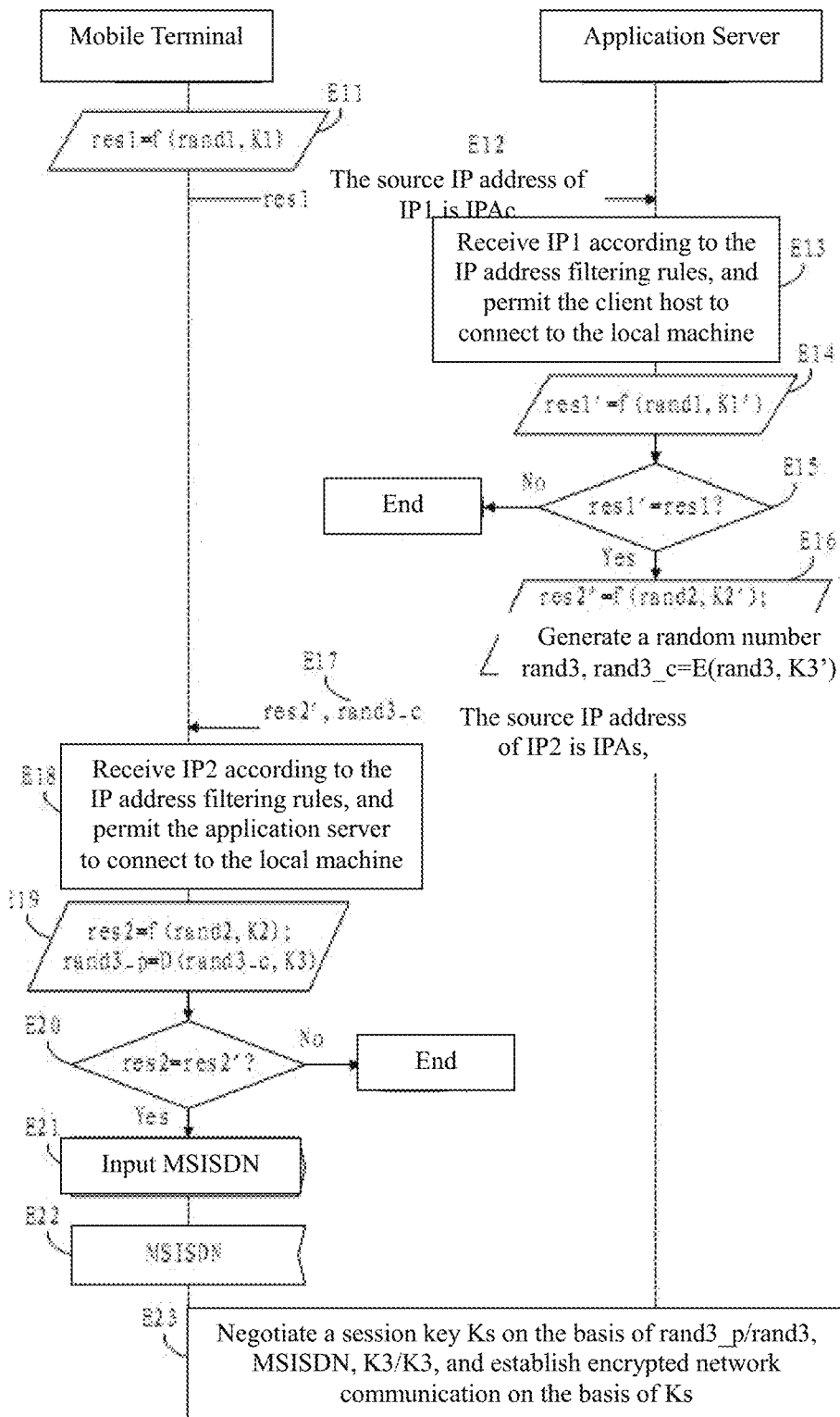
FIG. 6 is a flow diagram of the step E in the encrypted communication method in embodiment 2 of the present invention.

As shown in FIG. 6, in the embodiment 2, the step E further comprises:

step E11: the client host calculates res1=f(rand1, K1), where, re1 is response, rand1 is a random number, K1 is a key, f is an encryption function, and f comprises an one-way hashing function, a symmetric encryption function, and a function composed of the two functions;

step E12: the client host sends the res1 by means of an IP data packet IP1, to the application server, wherein, the source IP address of the IP1 is the IPAc;

step E13: the application server executes IP address filtering, receives the IP1 according to the IP address filtering rules, and permits the client host to connect to the application server;

step E14: the application server calculates res1'=f(rand1, K1'), wherein, re1' is response, rand1 is a random number, and K1' is a key;

step E15: the application server compares the res1' with the res1; the execution jumps to step E16 if they are the same; otherwise the entire process is terminated;

step E16: the application server calculates res2'=f(rand2, K2'), wherein, re2' is response, rand2 is a random number, and K2' is a key; the application server generates a random number rand3, and calculates rand3_c=E(rand3, K3'), where, rand3_c is the cryptograph, K3' is a key, and E is an encryption function;

step E17: the application server sends the res2' and rand3_c by means of an IP data packet IP2 to the client host, wherein, the source IP address of the IP2 is the IPAs;

step E18: the client host executes IP address filtering, receives the IP2 according to the IP address filtering rules, and permits the application server to connect to the client host;

step E19: the client host calculates res2=f(rand2, K2), where, res2 is response, rand2 is a random number, and K2 is a key; the client host calculates rand3_p=D(rand3_c, K3), where, rand3_p is plain text obtained by decrypting the rand3_c, rand3_c is the cryptograph, K3 is a key, and D is a decryption function corresponding to the encryption function E;

step E20: the client host compares the res2 with the res2'; the execution jumps to step E21 if they are the same; otherwise the entire process is terminated;

step E21: the client host prompts the user to input the MSISDN into the client host;

step E22: the MSISDN is inputted into the client host;

step E23: the client host and the application server negotiate a session key Ks on the basis of the rand3_p/rand3, MSISDN, and K3/K3', and establish encrypted network communication on the basis of the Ks between them; or, the application server selects a parameter C in random in the user information provided by the user when the user opens the account, and prompts the name of the parameter C to the user via the mobile terminal or the client host and instructs the user to input the parameter C into the client host; and the client host and the application server negotiate a session key Ks on the basis of the parameter C, rand3_p/rand3, MSISDN, and K3/K3', and establish encrypted network communication on the basis of the Ks between them.

In the step E23, the user information comprises the user's biometric signature, IMSI (International Mobile Subscriber Identity), IMEI (International Mobile Equipment Identity), ICCID (Integrated Circuit Card Identity), bank account number, ID indicated on the identity card, expiry date indicated on the identity card or address indicated on the identity card.

Figure 7:
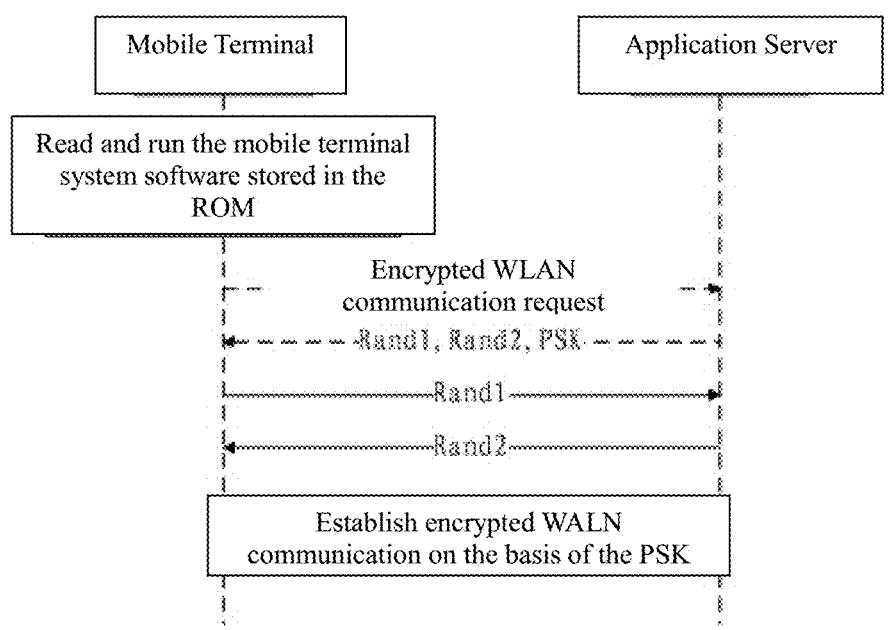
FIG. 7 is a flow diagram of the method for establishing encrypted WLAN communication in embodiment 3 of the present invention.

As shown in FIG. 7, in embodiment 3, a method for establishing encrypted WLAN communication between a mobile terminal and an application server is provided, comprising the following steps:

the mobile terminal reads and runs mobile terminal system software stored in its Flash ROM;

the mobile terminal sends a WLAN encrypted communication request to the application server through a mobile communication network;

the application server generates random numbers Rand1 and Rand2, and a pre-shared key PSK, wherein, there is no calculation relationship between Rand1 and Rand2, between Rand1 and PSK, and between Rand2 and PSK; then, the application server sends the Rand1, Rand2, and PSK to the mobile terminal through the mobile communication network;

the mobile terminal sends the Rand1 to the application server through a WLAN;

the application server sends the Rand2 to the mobile terminal through the WLAN, after it authenticates that the Rand1 is correct;

the WLAN authentication process ends, after the mobile terminal authenticates that the Rand2 is correct;

the mobile terminal and the application server establish encrypted WLAN communication between them on the basis of the PSK.

In embodiment 3, since the mobile terminal uses the software stored in its ROM after it is started up, the harms of computer viruses to the mobile terminal are prevented; since there is no calculation relationship between Rand1 and PSK and between Rand2 and PSK, exhaustive attacks to the pre-shared WLAN key PSK on the basis of authentication information transmitted through the WLAN are prevented.

Figure 8:
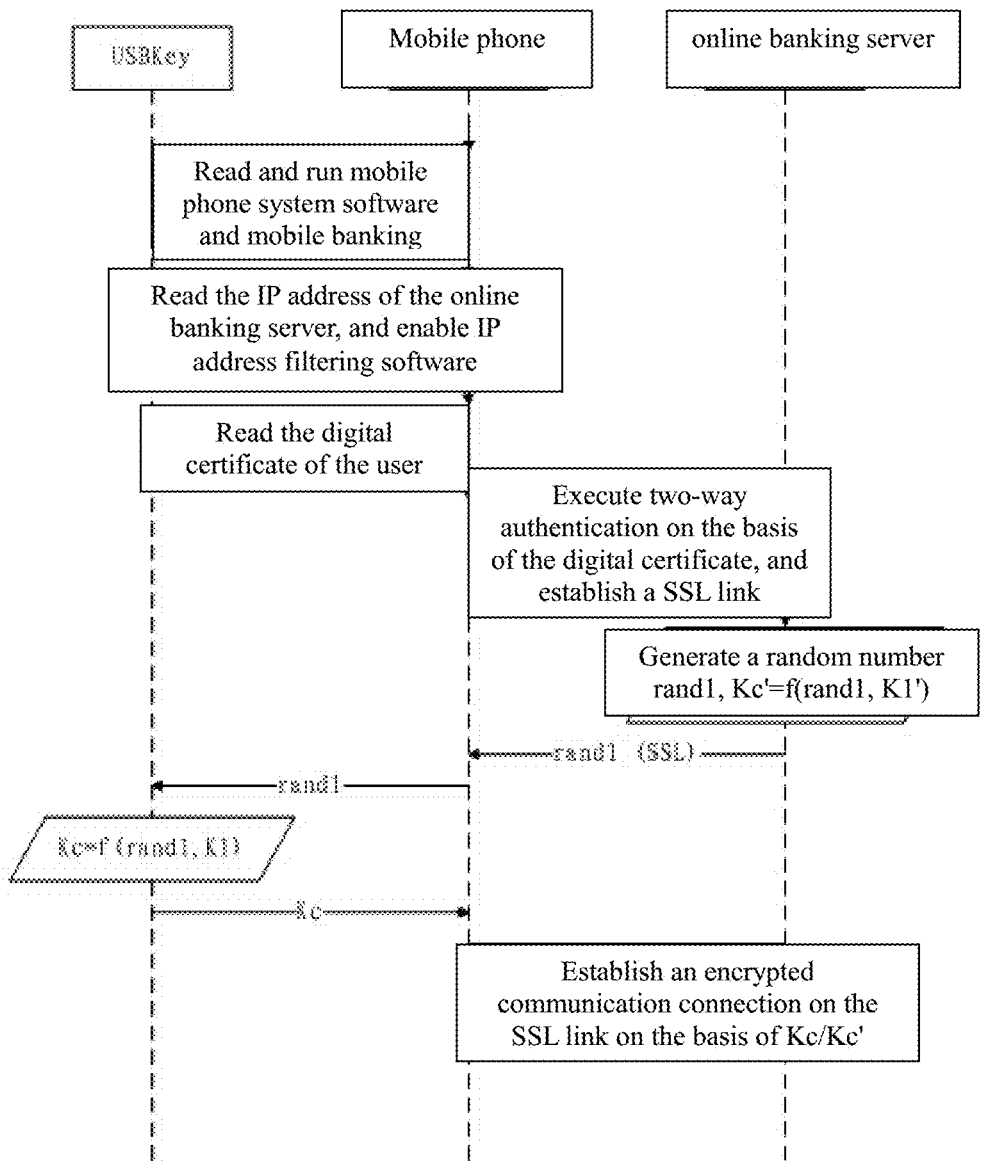
FIG. 8 is a flow diagram of the method for implementing mobile banking in embodiment 4 of the present invention.

As shown in FIG. 8, in embodiment 4, a method for implementing mobile banking with an USBKey, a mobile phone, and an online banking server is provided, wherein, the USBKey is connected with the mobile phone through an OTG (On-The-Go) cable, and the USBKey is read-only for the mobile phone. Before the method is used, the user registers to the online banking server; the online banking server writes the mobile phone system software, mobile banking software, and IP of the online banking server into the USBKey, generates and stores a digital certificate of the user, and writes the digital certificate into the USBKey, generate symmetric keys K1/K1', stores the K1' and writes the K1 into the USBKey, wherein, there is no calculation relationship between the K1 and the digital certificate of the user and between the K1 and the digital certificate of the online banking server. The method comprises the following steps:

the mobile phone is started, and reads and runs the mobile phone system software and the mobile banking software stored in the USBKey;

the mobile phone reads the IP address of the online banking server stored in the USBKey, sets IP address filtering rules according to the IP address, and permits the online banking server to connect to the mobile phone;

the mobile phone reads the digital certificate of the user stored in the USBKey;

the mobile phone and the online banking server execute two-way authentication and establish a SSL link between them, on the basis of the digital certificate of the user and the digital certificate of the online banking server;

the online banking server generates a random number rand1, and calculates Kc'=f(rand1, K1'), where, Kc' is the communication key, K1' is a key, f is an encryption function, and f comprises an one-way hashing function, a symmetric encryption function, and a function composed of the two functions;

the online banking server sends the rand1 to the mobile phone via the SSL link;

the mobile phone sends the rand1 to the USBKey;

the USBKey calculates Kc=f(rand1, K1), where, Kc is the communication key, rand1 is a random number, and K1 is a key;

the USBKey sends the Kc to the mobile phone;

the mobile phone and the online banking server establishes an encrypted communication connection on the SSL link on the basis of the communication keys Kc/Kc', and the mobile banking software communicates with the online banking server through the encrypted communication connection on the SSL link.

In the embodiment 4, since the mobile phone uses the software stored in the read-only USBKey after it is started up, the harms of computer viruses to the mobile banking application are prevented; since the mobile phone uses the IP address of the online banking server stored in the USBKey instead of a DNS, the harms of DNS hijacking to the mobile banking application are prevented; since the mobile phone executes IP address filtering, the harms of phishing to the mobile phone are prevented; since the mobile phone and the online banking server execute two-way authentication on the basis of the digital certificate, the USBKey and the online banking server negotiate communication keys Kc/Kc' on the basis of K1/K1', and there is no calculation relationship between the authentication information and the communication keys, exhaustive attacks to the communication keys on the basis of authentication information are prevented; since the rand1 is transmitted via the SSL link and is used to negotiate the communication key Kc, the security of key negotiation is enhanced; since an encrypted communication connection is established on the SSL link, the security of mobile banking is enhanced.

In addition, when the user registers, the online banking server stores the digital certificate of the user, the ICCID of the SIM card in the mobile phone or the ID of the user's identity card, and writes the digital certificate of the online banking server into the USBKey; when the mobile phone and the online banking server execute two-way authentication on the basis of the digital certificate of the user and the digital certificate of the online banking server, the mobile phone reads the digital certificate of the online banking server stored in the USBKey, and sends the ICCID of the SIM card in the mobile phone or the ID of identity card inputted into the mobile phone to the online banking server; the online banking server reads the digital certificate of the user corresponding to the ICCID or the ID of identity card, which is stored in the online banking server; thus, the mobile phone and the online banking server can execute two-way authentication without exchanging digital certificates.

Since the mobile phone uses the digital certificate of the online banking server stored in the read-only USBKey, and the online banking server uses the digital certificate of the user corresponding to the ICCID or the ID of identity card, which is stored in the online banking server, the mobile phone and the online banking server can execute two-way authentication without exchanging public keys; thus, the security is enhanced.

In addition, all functions of the USBKey can be accomplished with a SD card, a Micro SD card, a SIM card, or the Flash ROM in the mobile phone, and these memory devices are read-only for the mobile phone.

In embodiment 5, a simplified method for the embodiment 2 of the present invention is provided, wherein, a mobile terminal is connected to a client host through a USB connection. The method comprises the following steps:

step A': the mobile terminal is started up, and reads and runs mobile terminal system software and mobile terminal network application software stored in a Read-Only form in the mobile terminal, and establishes mobile communication with the application server;

step B': the client host is started up, and reads and runs the client system software and the client network application software stored in a Read-Only form in the mobile terminal;

step C': the client host retrieves the IP address of the application server from the application server via the mobile terminal, sets IP address filtering rules, and permits the application server to connect to the client host; the application server retrieves the IP address of the client host from the client host via the mobile terminal, sets IP address filtering rules, and permits the client host to connect to the application server;

step D': the application server generates a session key, and sends the session key to the client host via the mobile terminal;

step E': the client host and the application server execute IP address filtering, and establish encrypted network communication between them on the basis of the session key.

In the embodiment 5, the client host and the application server don't employ two-way authentication and key negotiation; instead, they directly establish encrypted network communication on the basis of the session key transmitted via the mobile terminal; thus, exhaustive attacks to the session key on the basis of authentication information transmitted over the network are prevented.

While the present invention is described above in some preferred embodiments, the present invention is not limited to those preferred embodiments. Any modification, equivalent replacement, and improvement made without departing from the spirit and principle of the present invention shall be deemed as falling into the protected domain of the present invention.

I claim:

1. An encrypted communication method, comprising the following steps:

step A. executing two-way authentication and establishing encrypted mobile communication, and then executing key derivation, by and between a mobile terminal and an application server;

step B: starting a client host, and reading and running client system software and client network application software stored in a Read-Only Memory, by the client host;

step C. retrieving the IP address of the client host or application server respectively, and setting IP address filtering rules respectively, by the client host and the application server;

step D. generating random numbers and keys, and sending the random numbers and the keys to the client host via the mobile terminal, by the application server; and step E: executing IP address filtering, two-way authentication and key negotiation, and thereby establishing encrypted network communication, by and between the client host and the application server wherein step A further comprises:

step A11: executing two-way authentication on the basis of symmetric authentication keys Ka/Ka', and establishing encrypted mobile communication on the basis of symmetric communication keys Kc/Kc', by and between the mobile terminal and the application server, wherein, the Ka/Ka' and the Kc/Kc' have no calculation relationship between them;

step A12: generating random numbers R1, R2, R3 and R4, and deriving a new authentication key Ka', by the application server, wherein the step of deriving the new key Ka' comprises the steps of:

calculating MemPa'=f(R1, MemPa'), by the application server, on the basis of MemPa' stored in the application server, where, R1 is a random number, MemPa' is a key, f is an encryption function, and f comprises an one-way hashing function, a symmetric encryption function, and a function composed of the two functions;

calculating MemKa'=f(R2, MemKa'), by the application server, on the basis of MemKa' stored in the application server, where, R2 is a random number, and MemKa' is a key;

calculating Ka'=f(R1, R2, MemPa', MemKa'), by the application server, where, R1 and R2 are random numbers, MemPa' is a parameter, and MemKa' is a key;

deriving a new communication key Kc', by the application server, wherein, the Kc' derivation process and the Ka' derivation process have no calculation relationship between them, and the Kc' derivation process comprises:

calculating MemPc'=f(R3, MemPc'), by the application server, on the basis of MemPc' stored in the application server, where, R3 is a random number, and MemPc' is a key;

calculating MemKc'=f(R4, MemKc'), by the application server, on the basis of MemKc' stored in the application server, where, R4 is a random number, and MemKc' is a key;

calculating Kc'=f(R3, R4, MemPc', MemKc'), by the application server, where, R3 and R4 are random numbers, MemPc' is a parameter, and MemKc' is a key; and storing the Ka', Kc', MemPa', MemKa', MemPc', and MemKc', by the application server, so that they can be used for the next cycle of two-way authentication, encrypted communication, and key derivation;

step A13: sending the random numbers R1, R2, R3 and R4, by the application server, to the mobile terminal; and step A14: deriving a new authentication key Ka, by the mobile terminal, wherein the step of deriving the new authentication key Ka comprises the steps of:

calculating MemPa=f(R1, MemPa), by the mobile terminal, on the basis of MemPa stored in the mobile terminal, where, R1 is a random number, and MemPa is a key;

calculating MemKa=f(R2, MemKa), by the mobile terminal, on the basis of MemKa stored in the mobile terminal, where, R2 is a random number, and MemKa is a key;

calculating Ka=f(R1, R2, MemPa, MemKa), by the mobile terminal, where, R1 and R2 are random numbers, MemPa is a parameter, and MemKa is a key; and deriving a new communication key Kc, by the mobile terminal, wherein the step of deriving the new communication key Kc and the step of deriving the new authentication key Ka have no calculation relationship between them, and wherein the step of deriving the new communication key Kc comprises the steps of:

calculating MemPc=f(R3, MemPc), by the mobile terminal, on the basis of MemPc stored in the mobile terminal, where, R3 is a random number, and MemPc is a key;

calculating MemKc=f(R4, MemKc), by the mobile terminal, on the basis of MemKc stored in the mobile terminal, where, R4 is a random number, and MemKc is a key;

calculating Kc=f(R3, R4, MemPc, MemKc), by the mobile terminal, where, R3 and R4 are random numbers, MemPc is a parameter, and MemKc is a key; and storing the Ka, Kc, MemPa, MemKa, MemPc, and MemKc, by the mobile terminal, so that they can be used for the next cycle of two-way authentication, encrypted communication, and key derivation.

2. The encrypted communication method according to claim 1, wherein, the step B further comprises:

step B11: starting up the client host;

step B12: reading and running the client system software stored in the ROM, by the client host;

step B13: disabling the local hard disk, by the client host, with the client system software; and step B14: reading and running the client network application software stored in the ROM, by the client host.

3. The encrypted communication method according to claim 1, wherein, the step C further comprises:

step C11: obtaining an IP address IPAc for the client host, by the client host, from Internet;

step C12: reading the IP address IPAs of the application server stored in the ROM, by the client host; or, instructing the user to retrieve the IP address IPAs of the application server with the mobile terminal from the application server, and instructing the user to input the IPAs into the client host, by the client host;

step C13: setting IP address filtering rules, by the client host, to permit the client host to receive IP data packets of which the source IP address is the IPAs;

step C14: prompting the user to use the mobile terminal to send the IPAc to the application server, by the client host;

step C15: inputting the IPAc to the mobile terminal;

step C16: sending the IPAc, by the mobile terminal, to the application server; receiving the IPAc, and obtaining the MSISDN (Mobile Station Integrated Services Digital Network Number) of the mobile user's mobile terminal at the same time, by the application server; and step C17: setting IP address filtering rules, by the application server, to permit the application server to receive IP data packets of which the source IP address is the IPAc.

4. The encrypted communication method according to claim 1, wherein, the step D further comprises:

step D11: generating random numbers rand1 and rand2, and symmetric keys K1/K1', K2/K2' and K3/K3', by the application server, wherein, any two of the K1, K2 and K3 have no calculation relationship between them;

step D12: sending the rand1, rand2, K1, K2, and K3, by the application server, to the mobile terminal;

step D13: prompting the user to input the rand1, rand2, K1, K2, and K3 into the client host, by the mobile terminal; and step D14: inputting the rand1, rand2, K1, K2, and K3 into the client host.

5. The encrypted communication method according to claim 1, wherein, the step E further comprises:

step E11: calculating res1=f(rand1, K1), by the client host, where, re1 is response, rand1 is a random number, K1 is a key, f is an encryption function, and f comprises an one-way hashing function, a symmetric encryption function, and a function composed of the two functions;

step E12: sending the rest, by the client host, by means of an IP data packet IP1, to the application server, wherein, the source IP address of the IP1 is the IPAc;

step E13: executing IP address filtering, receiving the IP1 according to the IP address filtering rules, and permitting the client host to connect to the application server, by the application server;

step E14: calculating res1'=f(rand1, K1'), by the application server, wherein, re1' is response, rand1 is a random number, and KI is a key;

step E15: comparing the rest with the rest, by the application server; jumping to step E16 if they are the same; otherwise terminating the entire process;

step E16: calculating res2'=f(rand2, K2'), by the application server, where, re2' is response, rand2 is a random number, and K2' is a key; generating a random number rand3, and calculating rand3_c=E(rand3, K3'), by the application server, where, rand3_c is the cryptograph, K3' is a key, and E is an encryption function;

step E17: sending the res2' and rand3_c, by the application server, by means of an IP data packet IP2, to the client host, wherein, the source IP address of the IP2 is the IPAs;

step E18: executing IP address filtering, receiving the IP2 according to the IP address filtering rules, and permitting the application server to connect to the client host, by the client host;

step E19: calculating res2=f(rand2, K2), by the client host, where, res2 is response, rand2 is a random number, and K2 is a key; calculating rand3_p=D(rand3_c, K3), by the client host, where, rand3_p is plain text obtained by decrypting the rand3_c, rand3_c is the cryptograph, K3 is a key, and D is a decryption function corresponding to the encryption function E;

step E20: comparing the res2 with the res2', by the client host; jumping to step E21 if they are the same; otherwise terminating the entire process;

step E21: prompting the user to input the MSISDN into the client host, by the client host;

step E22: inputting the MSISDN into the client host; and step E23: negotiating a session key Ks on the basis of the rand3_p/rand3, MSISDN, and K3/K3', and establishing encrypted network communication on the basis of the Ks, by and between the client host and the application server; or, selecting a parameter C in random in the user information provided by the user when the user opens the account, and prompting the name of the parameter C to the user via the mobile terminal or the client host and instructing the user to input the parameter C into the client host, by the application server; and negotiating a session key Ks on the basis of the parameter C, rand3_p/rand3, MSISDN, and K3/K3', and establishing encrypted network communication on the basis of the Ks, by and between the client host and the application server.

6. The encrypted communication method according to claim 5, wherein, in the step E23, the user information provided by the user when the user opens the account comprises the user's biometric signature, IMSI (International Mobile Subscriber Identity), IMEI (International Mobile Equipment Identity), ICCID (Integrated Circuit Card Identity), bank account number, ID indicated on the identity card, expiry date indicated on the identity card or address indicated on the identity card.

7. The encrypted communication method according to claim 5, wherein, if the symmetric keys K1 and K2 are replaced with asymmetric keys K1a and K2a and any two of K1a, K2a, and symmetric key K3 have no calculation relationship between them, and the encryption function f is replace with an asymmetric encryption/decryption function, the client host, which is based on the private key K1a and the public key K2a, and the application server, which is based on the private key K2a and the public key K1a, execute two-way authentication between them simply by transmitting responses, without transmitting random numbers or exchanging public keys, and the responses have no calculation relationship between them.

8. The encrypted communication method according to claim 1, wherein, in the two-way authentication, only responses are transmitted, without transmitting random numbers, and public keys are not exchanged if an asymmetric encryption algorithm is used; in addition, the responses have no calculation relationship between them, and the responses and the session key have no calculation relationship between them.

9. The encrypted communication method according to claim 1, wherein, in each of the execution steps of the encrypted communication method, all functions of the client host can be accomplished via the mobile terminal.

10. An encrypted communication system, comprising:
a Read-Only Memory (ROM),
a client host,
a mobile terminal, and
an application server,
wherein the ROM is used to provide client system software, client network application software, and IP address of the application server to the client host;
wherein the client host is connected with the application server through a data communication network, and is used to read and run the client system software and the client network application software stored in the ROM, and read the IP address of the application server stored in the ROM, after it is started up; is used to send the IP address of the client host to the application server via the mobile terminal; is used to receive random numbers and keys from the application server via the mobile terminal; and is used to execute IP address filtering on the basis of the IP address of the application server, and execute two-way authentication and key negotiation with the application server, and thereby establish encrypted network communication with the application server;
wherein the mobile terminal is connected with the application server through a mobile communication network, and is used to execute two-way authentication and establish encrypted mobile communication with the application server; and is used to transmit random numbers, keys, and IP addresses to the client host and the application server;
wherein the application server is used to execute two-way authentication and establish encrypted mobile communication with the mobile terminal; is used to receive the IP address of the client host via the mobile terminal; is used to generate random numbers and keys, and send the random numbers and keys to the client host via the mobile terminal; and is used to execute IP address filtering on the basis of the IP address of the client host, and execute two-way authentication and key negotiation with the client host, and thereby establish encrypted network communication with the client host; and
wherein the ROM is one of a group consisting of CD-ROM, DVD-ROM, MASK ROM, PROM, EPROM, OTP ROM, EEPROM, and Flash ROM.

11. The encrypted communication system according to claim 10, wherein, the ROM is connected with the client host via a wired communication interface or wireless communication interface, or the ROM is designed as a hardware unit of the client host.

12. The encrypted communication system according to claim 10, wherein the mobile terminal is one of a group consisting of: a mobile phone, PDA, tablet PC, and laptop computer.

13. The encrypted communication system according to claim 10, wherein, in the encrypted communication system, all functions of the client host can be accomplished via the mobile terminal.

* * * * *